(12) United States Patent
Suzuki (10) Patent No.: US 7,115,419 B2
(45) Date of Patent: Oct. 3, 2006

(54) PROCESS FOR PRODUCING A FILM FOR CONTROLLING THE CHEMOTACTIC FUNCTION AND AN ARTIFICIAL MATERIAL AND PROCESS FOR PRODUCING THE ARTIFICIAL MATERIAL

(75) Inventor: Shinji Suzuki, Tokyo-to (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 123 days.

(21) Appl. No.: 10/802,937

(22) Filed: Mar. 18, 2004

(65) Prior Publication Data

US 2004/0185082 A1 Sep. 23, 2004

(30) Foreign Application Priority Data

Mar. 20, 2003 (JP) ............................. 2003-078056

(51) Int. Cl.
*C12N 5/00* (2006.01)
(52) U.S. Cl. ...................... 435/402; 427/553; 427/532; 427/554; 427/558; 435/29; 435/395
(58) Field of Classification Search ................ 435/395, 435/402, 29; 427/532, 553, 554, 558
See application file for complete search history.

(56) References Cited

U.S. PATENT DOCUMENTS 5,821,013 A * 10/1998 Miller et al. .................... 430/5
6,143,477 A * 11/2000 Rhieu .......................... 430/329

FOREIGN PATENT DOCUMENTS

EP 282201 A2 * 9/1988
JP 5-198499 8/1993

OTHER PUBLICATIONS

Hypolite, CL et al. Formation of microscale gradients of protein using heterobifunctional photolinkers. Bioconjugate Chem. 1997. 8: 658-663.*
Herbert, C. et al.: "Micropatterning gradients and controlling surface densities of photoactivatable biomolecules on self-assembled monolayers of oligo(ethylene glycol) alkanethiolates", Chemistry & Biology, vol. 4, No. 10, Oct. 1997, pp. 731-737, XP002289422 *p. 731-733 *.
Ye Tao et al., "Photoreactivity of alkylsiloxane self-assembled monolayers on silicon oxide surfaces", Langmuir, vol. 17, No. 15, Jul. 24, 2001, pp. 4497-4500, XP002289423 * p. 4497-p. 4498 *.
Lee, J. et al. "Interaction of cells on chargeable functional group gradient surfaces", Biomaterials, Elsevier Science Publishers BV., Barking, GB, vol. 18, No. 4, Feb. 1, 1997, pp. 351-358, XP004017229, ISSN: 0142-9612, *the whole document*.
Control of Cell Function by Concentration-Gradient Pattern-Immobilized Biological Macromolecules, Mitsuko Hayashi et al., Polymer Preprints, Japan, Macromolecule Society Association, Sep. 20, 1999, vol. 48, No. 10, pp. 2411-2412.

* cited by examiner

*Primary Examiner*—Leon B. Lankford, Jr.
*Assistant Examiner*—Susan E. Fernandez
(74) *Attorney, Agent, or Firm*—David S. Safran (57) ABSTRACT

A process for producing a film for controlling the chemotactic function in an extremely small area in which a chemotactic factor substance in the area has a concentration gradient in one direction. The invention further includes an artificial material with an arrangement in which, on a substrate, there is a film having a chemotactic factor substance for controlling the chemotactic function which it has a concentration gradient in one direction. The process of the invention includes controlling the amount of irradiation in one direction of the film such that the chemotactic factor substance is degenerated which results in a corresponding concentration gradient of the film in the one direction.

10 Claims, 3 Drawing Sheets

PROCESS FOR PRODUCING A FILM FOR CONTROLLING THE CHEMOTACTIC FUNCTION AND AN ARTIFICIAL MATERIAL AND PROCESS FOR PRODUCING THE ARTIFICIAL MATERIAL

BACKGROUND OF THE INVENTION

1. Field of the Invention

The invention relates to a process for producing a film for controlling a chemotactic function. The film is composed of a thin film of a chemotactic factor substance in which the chemotactic factor substance is in a state in which it has a concentration gradient in one direction. The invention also relates to an artificial material which includes a film for controlling the chemotactic function on a substrate, and a process for producing the artificial material.

2. Description of the Related Art

Recently, it has been determined that the structure of an artificial material, in which the cell function can be controlled, contributes greatly to the formation of a biological material with a precise function for use in the study of a cell function and the like.

For a particular type of artificial material, a material is used in which a cell growth factor or a cell adhesion factor has been fixed on a substrate of glass or a high molecular substance. Research is being conducted in which cell growth and differentiation are controlled by an artificial material of this arrangement.

In order to conduct this research, an artificial material is produced on a substrate of glass or a high molecular substance in which a chemotactic factor substance, such as insulin or the like, has been fixed, and using this artificial material experiments are carried out with respect to the cell breeding process, cell differentiation, cell motion, see for example "Control of cell function by gradual fixing of the surface density of physiologically active macromolecules", "Polymer Preprints", Macromolecule Society Association, Sep. 20, 1999, Vol. 48, No. 10, pp. 2411 to 2412.

The following issues have become evident as a result of the recent research:

On a thin film of chemotactic factor substance, the cells move in the one direction with a higher concentration of the chemotactic factor substance by a process of determining or consuming the chemotactic factor substance.

This behavior of the cells depends on the activity of the cells themselves.

The speed of motion is higher, the greater the cell activity.

The speed of motion is lower, the less the cell activity.

It is therefore possible that a cell's activity can be confirmed by measuring the speed of motion of the cells using one of the above cell properties. However, in order to measure the speed of motion of the cells, a thin film is required in which the concentration of the chemotactic factor substance, positioned in an extremely small area, changes essentially continuously in one direction, but a process for producing a thin film with this positioning and concentration gradient is not presently known.

SUMMARY OF THE INVENTION

The present invention eliminates the noted disadvantage of the prior art. Specifically, a primary object of the present invention is to provide a process for producing a film for controlling the chemotactic function in which a chemotactic factor substance is present in an extremely small area and in a state in which the concentration gradient of the chemotactic factor substance extends in one direction.

Another object of the invention is to provide an artificial material which includes a substrate having thereon a film for controlling the chemotactic function in which a chemotactic factor substance is present in an extremely small area and in a state in which the chemotactic factor substance has a concentration gradient extending in one direction, and a process for producing the artificial material.

These objects are achieved by a process of the invention for producing a film for controlling the chemotactic function, in which the direction of the concentration gradient is determined by the amount of irradiation, e.g., radiant light from a light source, changes. Specifically, the chemotactic factor substance has a concentration gradient due to the change in the amount of irradiation. This process is carried out in an atmosphere containing oxygen or ozone while a film containing a chemotactic factor substance is irradiated with light from a source such that the amount of irradiation in the area of the film of the chemotactic factor substance changes continuously in one direction, and thus the chemotactic factor substance is degenerated according to the change in irradiation.

The objects of the invention are also achieved by a process for producing a film for controlling the chemotactic function in which a light shielding plate is positioned in the area between the film of a chemotactic factor substance and a light source, positioned above the film, such that the positional relationship between the light shielding plate and the film of a chemotactic factor substance is changed relatively in the one direction.

The objects of the invention are further achieved by a process for producing a film for controlling the chemotactic function in which a mask is positioned between the film and a light source positioned above the film. The mask is provided with a region of a light transmission factor change in which the light transmission factor changes continuously in the one direction thereby resulting in the area of the chemotactic factor substance, upon irradiation of the film, having a change in chemotactic function in one direction.

The objects of the invention are also advantageously achieved by the above process for producing a film for controlling the chemotactic function in which the light source emits light with wavelengths that degenerate the chemotactic factor substance.

The objects of the invention are still further achieved by a process for producing an artificial material which includes a substrate on which there is a film for controlling the chemotactic function obtained by the above described process for producing the film having a change in chemotactic function in one direction.

The objects of the invention are specifically achieved by a process for producing an artificial material utilizing the following process steps:

Providing a base treatment film including an adhesive film of an adhesive substance having the ability to bond the chemotactic factor substance, Irradiating the surface of the base treatment film, in an atmosphere containing oxygen or ozone, with radiant light from a light source such that the amount of irradiation in the area of the adhesive film changes continuously in one direction so that the adhesive substance is degenerated, and Applying a solution containing the chemotactic factor substance to the surface of the base treatment film.

The result is a film for controlling the chemotactic function in which a chemotactic factor substance is present and has a concentration gradient as a result of the change in the amount of irradiation of radiant light from the light source on the base treatment film; and thus an artificial material is obtained in which there is this film for controlling the chemotactic function on a substrate.

The expression "continuously change" in the instant application is defined not only as a gradual continuous change with a constant ratio of change, but also includes an incremental change of the ratio of change; however, an essentially continuous change in the concentration is preferred.

By the process of the invention for producing a film for controlling the chemotactic function, which is carried out in an atmosphere which contains oxygen or ozone, an area of a film of chemotactic substance is irradiated with light, such that the amount of irradiation changes continuously in one direction, and thus the chemotactic factor substance in the irradiated area is degenerated resulting in the concentration of the chemotactic factor substance changing essentially continuously. Therefore, a film for controlling the chemotactic function can be easily obtained in which a chemotactic factor substance is present with a concentration gradient in an extremely small area irradiated in one direction.

Additionally, by the process as of the invention for producing an artificial material, which is carried out in an atmosphere which contains oxygen or ozone, an area of a film of an adhesive substance on a substrate surface is irradiated with light such that the amount of irradiation changes continuously in one direction causing the adhesive substance in this area to be degenerated. In the irradiated area, a base treatment film is obtained in which in one direction the amount of irradiation changes and as a result of the irradiation the concentration of the adhesive substance changes essentially continuously. Moreover, due to the fact that a solution which contains a chemotactic factor substance is applied to the surface of this base treatment film, a thin film can be formed in which the concentration of the chemotactic factor substance changes to the degree which corresponds to the change of the concentration of the adhesive substance in the base treatment film. Therefore, a film for controlling the chemotactic function can be easily obtained in which a chemotactic factor substance is present in the state in which it has a concentration gradient in one direction.

The invention is described in further detail below with reference to the accompanying drawings.

DETAILED DESCRIPTION OF THE INVENTION

The process of the invention for producing a film for controlling the chemotactic function is used to form a thin film which can control the chemotactic function of cells, and includes a process step in which, in an atmosphere which contains oxygen or ozone, a film of a chemotactic factor substance is irradiated with radiant light from a light source such that the amount of irradiation changes continuously in one direction in the area of the film of a chemotactic substance that is irradiated. It is necessary that the area of the film of a chemotactic substance to be irradiated has a larger dimension than the cell which is to be controlled (normally with an outside diameter from 10 microns to 30 microns).

Specifically, the following methods (1) and (2) can be employed for irradiating the area of the film of a chemotactic substance to be irradiated with radiant light from a light source:

(1) Method in which, in the area between the film of a chemotactic factor substance and a light source, located above this film of a chemotactic substance, there is a light shielding plate and in which the area of the film of chemotactic substance to be irradiated is gradually irradiated with radiant light from a light source by changing the positional relationship between this light shielding plate and the film of a chemotactic factor substance relatively in one direction (hereinafter called the "First Method").

(2) Method in which, in the area between the film of a chemotactic factor substance and a light source which is located above this film of a chemotactic substance, a mask with a region of light transmission factor change in which the light transmission factor changes continuously in one direction (hereinafter called "certain mask") and in which, over the area of light transmission factor change of the certain mask, the area of the film of chemotactic substance is irradiated with radiant light (hereinafter called the "Second Method").

The expression "chemotactic factor substance" is defined as a chemical factor substance which is used as a stimulation source for manifestation of the chemotactic property of cells with the chemotactic function. Specific examples of such substances are insulin, aspartic acid, and 3',5'-cyclic AMP (3',5'-cAMP=3',5'-cyclic adenosine monophosphate).

Processes for producing a film for controlling the chemotactic function by the First Method and the Second Method are further described below.

Figure 1:
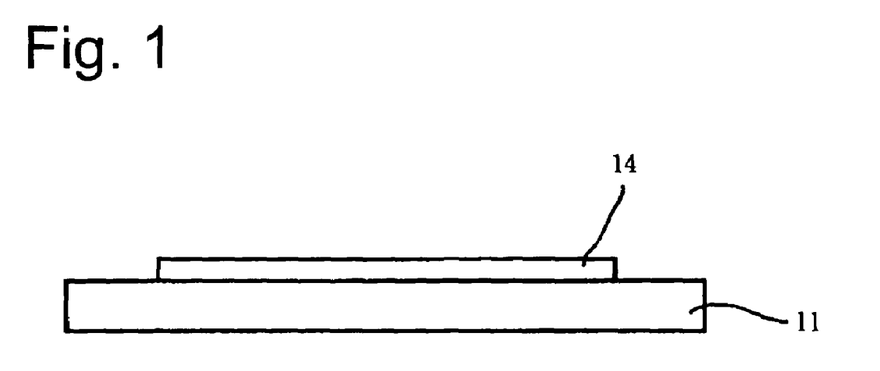
FIG. 1 shows a substrate on which a film of chemotactic factor substance of the invention is formed.

Process for Producing a Film for Controlling the Chemotactic Function by the First Method First, as shown in FIG. 1, a solution which contains the chemotactic factor substance is applied to the surface of a substrate 11, and a thin film of the chemotactic factor substance 14 is formed by drying.

Next, above the film of a chemotactic substance 14 formed on the substrate 11 (top in FIG. 2), there is a light source (not shown) and in the largest part (in the largest part at left in FIG. 2) of a substrate 18, composed of, for example, silica glass, a light shielding plate 17 is readied which has a light shielding part 17A provided with a film 19 that has been formed thereon, for example, by vapor deposition of chromium. The light shielding plate 17 is placed at a given point of the area 21 between the film of chemotactic factor substance 14 and the light source.

Figure 2:
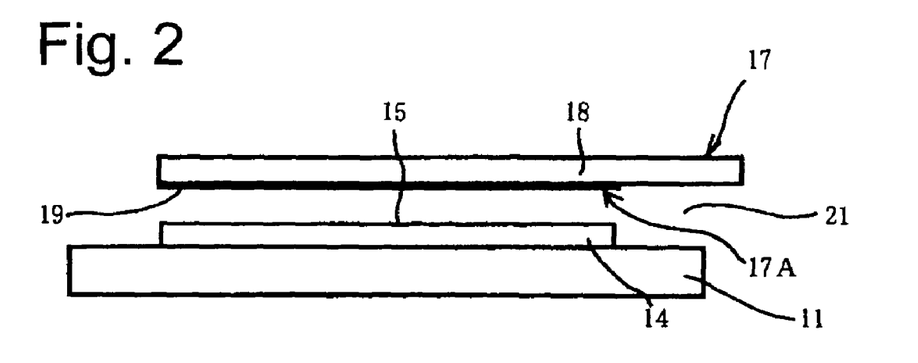
FIG. 2 shows a schematic in which, between the film of a chemotactic factor substance formed on the substrate and a light source (not shown), a light shielding plate is positioned at a given location.

In this example, the entire surface of the film of a chemotactic substance 14 (top in FIG. 2) is used as the area 15 which is to be irradiated, as is shown in FIG. 2. The light shielding plate 17 is parallel to the film of a chemotactic factor substance 14 and spaced, for example, 50 microns away from the film of the chemotactic factor substance 14. The plate 17 shields, by the light shielding part 17A, in the entire area of the area 15 which is to be irradiated.

Figure 3:
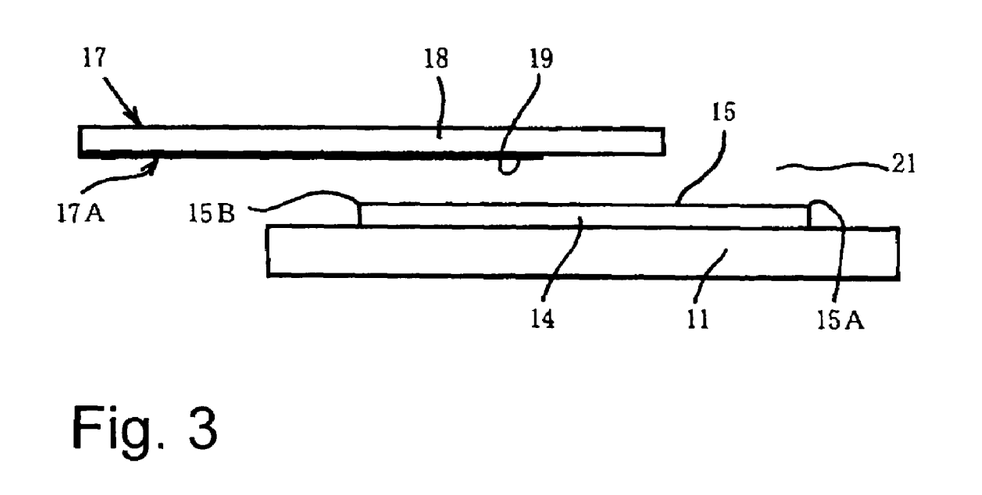
FIG. 3 shows a schematic of the state in which an area of the film of a chemotactic factor substance formed on the substrate is irradiated with radiant light from a light source.

As is shown in FIG. 3, the area which is irradiated with radiant light is gradually enlarged as follows:

In an atmosphere which contains oxygen or ozone in the form of air or the like, for example, under the condition under which the illuminance of the radiant light is for example 5 mW/cm$^2$, the light source is shifted into the operating state.

Thereafter, the light shielding plate 17 is moved from one end 15A (right end in FIG. 3) in the area 15 of the film of a chemotactic substance 14 to the other end 15B (left end in FIG. 3), i.e. to the left in FIG. 3, with a constant speed, for example, of 5 microns/sec.

Consequently, the area 15 to be irradiated is gradually irradiated with radiant light from the light source from the end 15A. In this way, the entire area of the area 15 which is to be irradiated is finally irradiated with radiant light from the light source (see FIG. 4).

In this embodiment, under the condition under which the distribution of illuminance in the entire area of the area 15 is uniform, the irradiation time from one end 15A to the other end 15B of the area 15 is gradually shortened, and the amount of irradiation of radiant light from the light source for the area 15 is changed such that the amount of irradiation decreases continuously in the direction from one end 15A to the other end 15B. This embodiment provides a film 30 for controlling the chemotactic function with a concentration gradient in which the concentration of the chemotactic factor substance increases from one end 30A to the other end 30B as shown schematically in FIG. 4.

Figure 4:
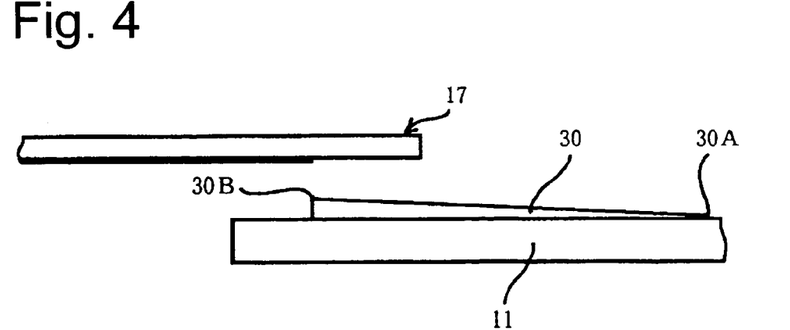
FIG. 4 shows another embodiment of a film for controlling the chemotactic function of the invention which has been formed on the substrate, and a light shielding plate.

Specifically, for illustration purposes, FIG. 4 shows the film 30 for controlling the chemotactic function in the state in which its surface (top in FIG. 4) is inclined. In this inclined state of the surface, the concentration gradient is shown as a change of thickness in which the concentration of the chemotactic factor substance increases from one end 30A to the other end 30B.

The solution which contains a chemotactic factor substance can be a solution which is formed by dissolution of the chemotactic factor substance in a solvent, such as for example alcohol, water or the like. The solution which contains the chemotactic factor substance can also contain a binder in an amount in which no detrimental effect is imparted to the control function of the resulting film 30 for controlling the chemotactic function.

The film of the chemotactic factor substance 14 has an actual thickness of one monomolecular layer up to several multimolecular layers of the chemotactic factor substance. This thickness differs depending on the type of chemotactic factor substance, but is normally 0.1 micron to 1 micron.

It is necessary for the light shielding part 17A of the light shielding plate 17 to have a width which is greater than or equal to the width of the area 15 which is to be irradiated (length of the direction perpendicular to the page of the drawing in FIG. 2) of the film of the chemotactic substance 14.

The light source should be a light source which emits light in wavelengths which decompose and degenerate the chemotactic factor substance.

It is advantageous for the wavelength of the light source to be less than or equal to 220 nm, especially less than or equal to 200 nm, when the atmosphere contains oxygen. In the embodiment in which the atmosphere contains ozone, it is advantageous for the wavelength to be less than or equal to 300 nm, especially less than or equal to 270 nm.

Specifically, the light source can be an excimer laser, an excimer lamp, a low pressure mercury lamp or the like. An excimer lamp which has a bright line at a wavelength of 172 nm, or a low pressure mercury lamp which has bright lines at a wavelength of 185 nm or 254 nm can be advantageously used.

In this process for producing a film for controlling the chemotactic function by the First Method, radiant light from the light source comes into contact with oxygen or ozone to form active oxygen by the action of UV radiation contained in the radiant light. The film of the chemotactic factor substance 14 is ashed by the oxidation reaction by this active oxygen. As a result, in this film of a chemotactic factor substance 14, the concentration of the chemotactic factor substance decreases in the area which has been irradiated with radiant light from the light source. In doing so the following factors are to be considered:

The ashing ratio of the film of a chemotactic substance 14 depends on the amount of irradiation of radiant light.

The ashing ratio of the film of a chemotactic substance 14 is proportional to the irradiation time.

This means that the film 30 for controlling the chemotactic function with a concentration gradient in which the concentration of the chemotactic factor substance increases from one end 30A which corresponds to the end 15A to the other end 30B which corresponds to the other end 15B can be easily formed by gradually shortening the irradiation time of the radiant light from the light source for the area 15 which is to be irradiated from one end 15A to the other end 15B and by reducing the ashing ratio.

Furthermore, in this process for producing a film for controlling the chemotactic function, the light shielding plate 17 is moved with a constant speed, by which in the area 15 the radiant light from the light source changes continuously with a constant ratio of change. The resulting film 30 for controlling the chemotactic function therefore has a concentration gradient for which the concentration of the chemotactic factor substance continuously changes with a constant ratio.

Process for Producing a Film for Controlling the Chemotactic Function by the Second Method First, a film of the chemotactic factor substance in the form of a thin film is formed on a substrate 11 of for example glass by the same process as in the First Method.

Then, above the film of the chemotactic substance on the substrate a light source is placed, a certain mask is prepared and it is placed at a given location between the film of the chemotactic factor substance and the light source.

In this example, the certain mask has a region of light transmission factor change in which the transmission factor increases gradually from one end to the other end. The certain mask is arranged such that the region of light transmission factor change corresponds to the area of the film of a chemotactic factor substance to be irradiated, and is located parallel to the film of the chemotactic factor substance and at a location, for example, 50 microns from this film of a chemotactic factor substance opposite the entire area to be irradiated.

The substrate is irradiated in an atmosphere which contains oxygen or ozone, such as air or the like, under the illuminance of the radiant light, at for example 5 mW/cm$^2$, shifted into the operating state. The entire area of the area of the film of a chemotactic factor substance is irradiated at the same time with the light which has been emitted from the light source over the region of light transmission factor change of the certain mask.

In this way, the irradiation time of the radiant light from the light source is uniform over the entire area to be irradiated with the certain mask and the illuminance increases gradually from one end of the area of light transmission factor change of the certain mask to the other end. Therefore, the amount of irradiation from the light source changes such that it continuously increases in the direction from one end to the other end. In this way, a film for controlling the chemotactic function is formed with a concentration gradient in which the concentration of the chemotactic factor substance decreases from one end to the other end.

The certain mask for controlling the distribution of the illuminance has a region in which light transmission factor changes essentially continuously in one direction. That is, the mask for controlling the distribution of the illuminance includes a mask in which the light transmission factor changes from one end to the other with a constant ratio of change, or a mask in which the light transmission factor changes incrementally from one end to the other. In the certain mask in which the light transmission factor changes incrementally, the amount of change of the light transmission factor corresponds to the amount of desired change of the concentration of the chemotactic factor substance of the resulting film for controlling the chemotactic function. Therefore, it is necessary to set this amount of change of the light transmission factor to correspond to the range in which the resulting film for controlling the chemotactic function has the desired amount of change of the concentration to enable a control function for the cells to be developed.

Specifically, the certain mask for controlling the distribution of illuminance can be a filter, for example a transparent substrate on which a film has been formed by vapor deposition of a metal in a pattern. The pattern includes openings arranged such that the size of the opening increases from one end of this transparent substrate to the other end. This film can be produced, for example, by the method which is disclosed in Japanese patent disclosure document HEI 7-35921.

The light source can advantageously be an excimer lamp or a low pressure mercury lamp, as in the First Method.

In this process for producing a film for controlling the chemotactic function by the Second Method, radiant light from the light source comes into contact with oxygen or ozone to form active oxygen by the action of UV radiation contained in the radiant light. The film of the chemotactic factor substance 14 is ashed by the oxidation reaction by this active oxygen. As a result, in this film of a chemotactic factor substance 14, the concentration of the chemotactic factor substance decreases in the area which has been irradiated with radiant light from the light source. In doing so, the following factors are to be considered:

The amount of ashing of this film of a chemotactic substance depends on the amount of irradiation of radiant light.

The amount of ashing of this film of a chemotactic substance is proportional to the illuminance.

This means that the film for controlling the chemotactic function with a concentration gradient in which the concentration of the chemotactic factor substance decreases from one end to the other end can be easily formed by gradually increasing the illuminance of the radiant light for the area to be irradiated from one end to the other end and by increasing the ashing ratio.

Since, in this process for producing a film for controlling the chemotactic function, the entire area of the area of the film of a chemotactic factor substance is irradiated at the same time with radiant light, the time which is necessary for the process of irradiating the film of a chemotactic substance with radiant light is shortened more than in the process for producing a film for controlling the chemotactic function by the First Method.

By the above described process, a film for controlling the chemotactic function is produced by irradiating, in an atmosphere which contains oxygen or ozone, the area of a film of a chemotactic factor substance with radiant light such that the amount of irradiation changes continuously in one direction. Thus, the chemotactic factor substance in the irradiated area is ashed, resulting in the irradiated area having a continuous change in the concentration of the chemotactic factor substance, i.e., concentration decreases according to the increase of the amount of irradiation of radiant light from the light source. Therefore, a film for controlling the chemotactic function can be easily obtained in which a chemotactic factor substance and has a concentration gradient in an extremely small area irradiated in one direction.

In practice, by the process for producing a film for controlling the chemotactic function by the First Method and by the process for producing a film for controlling the chemotactic function by the Second Method, a film for controlling the chemotactic function with a concentration gradient can be easily obtained in which even in an extremely small area the concentration of the chemotactic factor substance changes in one direction even when the area to be irradiated has a width of the one direction of irradiation that is extremely small in size, for example, 100 microns.

Since the film for controlling the chemotactic function, obtained by this production process, has a concentration gradient in which in one direction the concentration of the chemotactic factor substance changes essentially continuously, it can be advantageously used as the material component of an artificial material for confirmation of cell activity.

The artificial material of the invention includes a substrate having a film for controlling the chemotactic function obtained by the above described process for producing a film for controlling the chemotactic function.

In an artificial material of this arrangement, the substrate can be the substrate used in the process for producing the above described film for controlling the chemotactic function. Therefore, a support structure, including a film for controlling the chemotactic function formed on the substrate, is obtained by the process described above for producing a film for controlling the chemotactic function and can be used unchanged as the artificial material.

The artificial material in which there is a film for controlling the chemotactic function on the substrate (hereinafter also called "artificial material") can be produced by the sequence of process steps of the invention for producing a film for controlling the chemotactic function by forming the support structure from the substrate and the film for controlling the chemotactic function. The process for producing an artificial material which contains a film for controlling the chemotactic function is, however, not limited thereto, but a single embodiment is described by the method below.

Figure 5:
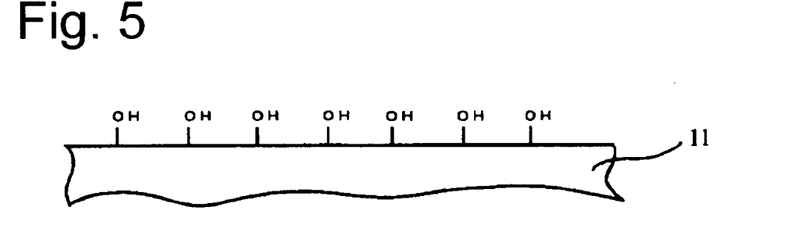
FIG. 5 shows the state of the surface of a glass substrate employed in the process of the invention.

A liquid of an adhesive material with the ability to cement the chemotactic factor substance is applied to the top surface of a glass substrate 11 which has for example the surface state shown in FIG. 5; a chemotactic factor substance, such as hexamethyl disilazane (HMDS), which is described by the formula (1) below, in the form of an adhesive liquid is applied and drying is carried out. A film 43 of an adhesive material in the form of a thin film is formed which has the surface state shown in FIG. 6.

$(CH_3)_3Si—NH—Si(CH_3)_3$  Formula (1)

Figure 6:
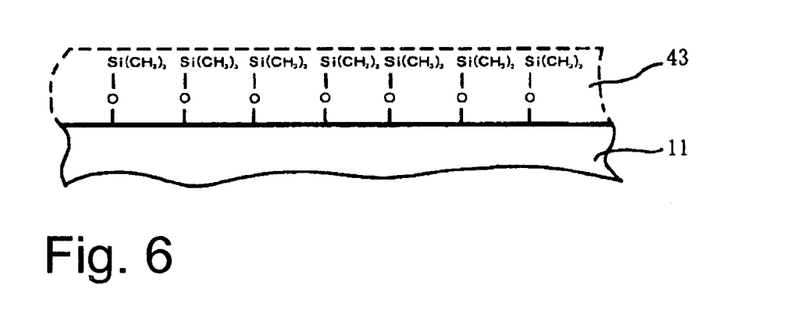
FIG. 6 shows the state of a hexamethyl disilazane adhesive film which has been formed on a glass substrate.

The film 43 of adhesive material which is formed on the substrate 11 is irradiated in an atmosphere containing oxygen or ozone, such as for example air or the like, with a radiant light source, of an illuminance of for example 5 mW/cm$^2$, in an operating state such that the amount of irradiation in the area of the film 43 of adhesive material which is to be irradiated (in this example, on the entire surface of the film 43 of adhesive material) changes continuously in one direction (to the right and left in FIG. 6).

The method for irradiating the area of the film 43 of adhesive material with radiant light from the light source can be the same methods as the First Method and the Second Method for producing the film for controlling the chemotactic function, specifically the methods (A) and (B) described below.

(A) Method in which between the film of an adhesive material and a light source above this film there is a light shielding plate, and the area of the film of an adhesive material is gradually irradiated with the radiant light from the light source while the positional relationship between this light shielding plate and the film of an adhesive material is relatively changed in one direction.

(B) Method in which in the area between the film of an adhesive material and a light source located above this film there is positioned a certain mask with a region of light transmission factor change in which the light transmission factor changes continuously, and in which the area of the film of adhesive material is irradiated with radiant light from the light source over the region of light transmission factor change of the certain mask.

Figure 7:
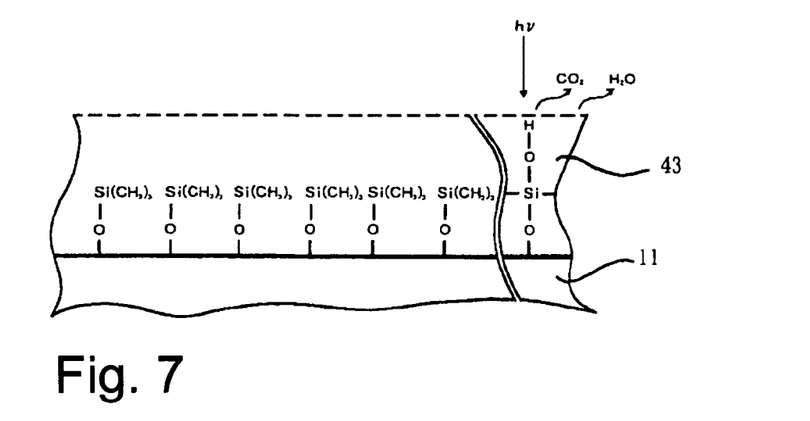
FIG. 7 shows the process of the invention in which an adhesive substance comprising an adhesive film is degenerated by irradiation of the film of a hexamethyl disilazane adhesive substance with radiant light from the light source.

Due to the irradiation (UV) treatment, the adhesive material comprising the film 43 of an adhesive material is decomposed by the action of the UV radiation in the radiant light from the light source on the oxygen or ozone, as is shown in FIG. 7. As a result, the film 43 of adhesive material the concentration of the adhesive material decreases in the area which is irradiated with radiant light from the light source. Since the ratio of the reduction of this concentration of adhesive material is proportional to the amount of irradiation of radiant light, because for the area which is to be irradiated from one end (right end in FIG. 7) to the other end (left end in FIG. 7) the amount of radiation of the light source gradually decreases, a base treatment film 45 (in FIG. 8) is formed with a concentration gradient in which the concentration of the adhesive material decreases from one end to the other end.

Since in the resulting base treatment film 45 the ability to cement the chemotactic factor substance with the adhesive material has been lost by degeneration, the chemotactic factor substance is cemented proportionally more frequently, the more the other end with the high concentration of the adhesive material is approached. FIG. 7 shows the state in which the adhesive material which is present in the right area of the film 43 of adhesive material is degenerated.

Figure 8:
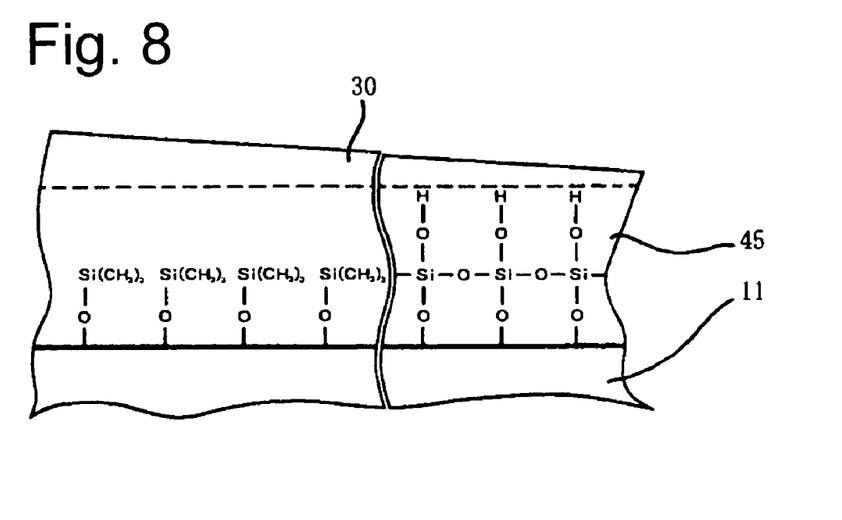
FIG. 8 shows a schematic of an artificial material of the invention with an arrangement in which a film for controlling the chemotactic function is formed on a glass substrate.

By applying a solution which contains a chemotactic factor substance to the entire surface of the base treatment film 45 which has been formed on the substrate 11, as is shown in FIG. 8, a film 30 for controlling the chemotactic function is formed in which there is an adhesive substance in the state in which the concentration gradient is present which corresponds to the concentration gradient of the concentration of the adhesive substance in the base treatment film 45 and which specifically has a concentration gradient in which the concentration of the chemotactic factor substance increases from one end (e.g., the right end in FIG. 8) to the other end (left end in FIG. 8).

FIG. 8 shows the film 30 for controlling the chemotactic function in the state in which its surface (top in FIG. 8) is inclined. In this inclined state of the surface, the concentration gradient is shown as a change of thickness in which the concentration of the chemotactic factor substance increases from one end to the other end. In this way, a artificial material is produced in which the film 30 for controlling the chemotactic function is formed on the substrate 11.

The film 30 for controlling the chemotactic function has the same function as the film for controlling the chemotactic function which is obtained by the above described process for producing a film for controlling the chemotactic function.

The light source can advantageously be an excimer lamp or a low pressure mercury lamp. It is advantageous for the wavelength of the light source to be less than or equal to 220 nm, especially less than or equal to 200 nm, when the atmosphere contains oxygen. In the embodiment in which the atmosphere contains ozone, it is advantageous for the wavelength to be less than or equal to 300 nm, especially less than or equal to 270 nm.

Figure 9:
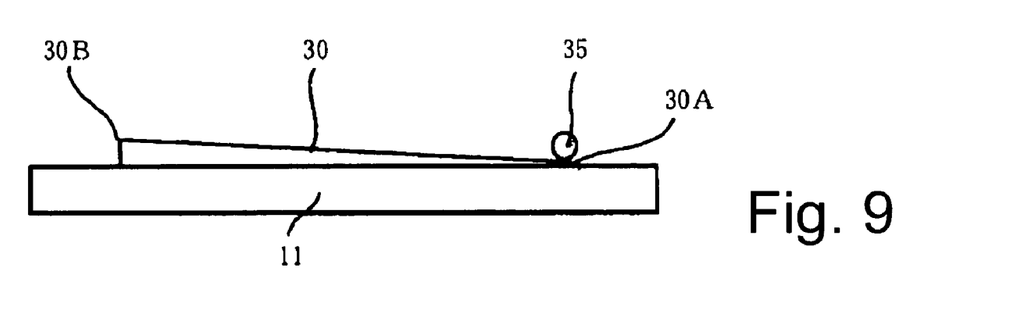
FIG. 9 illustrates the position of a cell positioned on one end of the film for controlling the chemotactic function formed on a substrate of an artificial material of the invention.

The process for confirming cell activity using this artificial material can be carried out as follows, as is shown for example in FIG. 9.

A cell 35 with activity which is to be confirmed (hereinafter also called the object cell) is placed with the artificial material on one end with a low concentration of the chemotactic factor substance of the film for controlling the chemotactic function.

Figure 10:
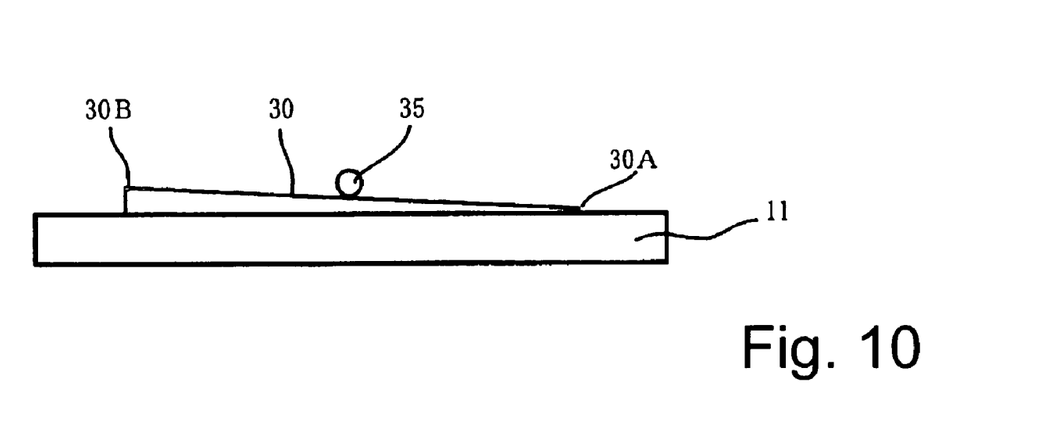
FIG. 10 illustrates the movement of a cell positioned on one end of the film for controlling the chemotactic function formed on a substrate of the invention according the concentration gradient of the chemotactic factor substance.

The time is measured during which the object cell 35 moves to one side of the film 30 with a higher concentration of the chemotactic factor substance and finally reaches the end with a higher concentration of the chemotactic factor substance as is shown in FIG. 10, e.g., by observation using a microscope.

The activity of this object cell 35 is confirmed based on the speed of movement of the object cell which is computed by the distance moved and the movement time of this object cell 35.

It is necessary that the chemotactic factor substance for the film for controlling the chemotactic function be suitably chosen according to the type of object cells, the ambient test conditions and the like. If, for example, the object cell is a bacterium, a film for controlling the chemotactic function can be composed of aspartic acid as the chemotactic factor substance. When the object cell is a cellular myxomycete, a film for controlling the chemotactic function can be composed of 3',5'-cAMP (3',5'-cyclic cAMP) as the chemotactic factor substance. Further, it is possible for this process for confirming the activity of the cells using an artificial material to be used also for studying the metastasis of cancer cells.

While the invention has been described above with regard to particular embodiments, various changes within the scope of the present invention can be added. For example, in the process for producing a film for controlling the chemotactic function by the First Method the positional relationship between the film of a chemotactic factor substance and the light shielding plate can change in relative terms. That is, instead of or in addition to the light shielding plate moving, the substrate on which the chemotactic factor substance is formed can also move. Furthermore, in the process for producing a film for controlling the chemotactic function by the First Method the positional relationship between the film of a chemotactic factor substance and the light shielding plate can change intermittently according to a control function such that the concentration of the chemotactic factor substance of the resulting film for controlling the chemotactic function changes incrementally.

Additionally, in the process for producing a film for controlling the chemotactic function by the First Method and in the Second Method when using insulin as the chemotactic factor substance and using a glass substrate, hexamethyl disilazane (HMDS) can be applied to the surface of the glass substrate which makes the glass surface hydrophobic, and has the result of cementing insulin and facilitating its attachment, and an insulin film can also be formed after degeneration of the surface of this substrate.

ACTION OF THE INVENTION

By the process of the invention for producing a film for controlling the chemotactic function, in an atmosphere which contains oxygen or ozone, an area of a film of chemotactic substance is irradiated with radiant light from a light source, such that the amount of irradiation changes continuously in one direction and that, thus, the chemotactic factor substance in the irradiated area is degenerated. This results in the concentration of the chemotactic factor substance changing essentially continuously. Therefore, a film for controlling the chemotactic function can be easily obtained in which a chemotactic factor substance is present in the state in which it has a concentration gradient in an extremely small area and in one direction.

In the artificial material of the invention, on the substrate there is a film for controlling the chemotactic function in which a chemotactic factor substance is present in the state which has a concentration gradient in one direction in an extremely small area and is obtained by the above described production process. The speed of movement of the cells can be measured using this artificial material and thus the activity of the cells can be confirmed.

By the process of the invention for producing an artificial material, in an atmosphere which contains oxygen or ozone, an area of an adhesive film substance formed on a substrate surface is irradiated with radiant light such that the amount of irradiation changes continuously in one direction and that the adhesive substance in this area to be irradiated is degenerated. Thus, in the irradiated area, a base treatment film can be obtained in which in one direction the amount of irradiation changes which results in the concentration of the adhesive substance changing essentially continuously. Moreover, due to the fact that a solution which contains a chemotactic factor substance is applied to the surface of this base treatment film, a thin film can be obtained in which the concentration of the chemotactic factor substance changes in a manner which corresponds to the change of the concentration of the adhesive substance in the base treatment film. Therefore, a film for controlling the chemotactic function can be easily obtained in which a chemotactic factor substance is present in the state in which it has a concentration gradient in one direction.

What is claimed is:

1. A process for producing a film containing a chemotactic factor substance from the group consisting of insulin, aspartic acid and 3',5'-cyclic adenosine monophosphate, which is capable of controlling a chemotactic function, comprising:
   providing a film having an area containing the chemotactic factor substance;
   placing the film in an atmosphere containing at least one of oxygen and ozone;
   irradiating the film with light from a light source having an excimer lamp producing light with a bright line at 172 nm, and
   changing the amount of irradiation exposure essentially continuously across the area of the film containing the chemotactic factor substance in a given direction such that the chemotactic factor substance is correspondingly degenerated dependent on the amount of irradiation to produce a concentration gradient of the chemotactic factor substance in the film.

2. Process for producing a film as claimed in claim 1, further comprising:
   positioning the light source above the film, and
   positioning a light shielding plate between the film containing a chemotactic factor substance and the light source, and
   during irradiation of the film, changing the relative positional relationship between the light shielding plate and the film of the chemotactic factor substance in the given direction to produce a concentration gradient of the chemotactic factor substance in the film.

3. Process for producing a film as claimed in claim 1, further comprising:
   positioning the light source above the film, and
   positioning a mask with a region of light transmission factor change in which the light transmission factor changes continuously in a given direction between the film containing a chemotactic factor substance and the light source, and
   during irradiation of the film, changing the amount of irradiation exposure of the film continuously as the changing light transmission factor changes continuously in the given direction to produce a concentration gradient of the chemotactic factor substance in the film.

4. Process for producing a film as claimed in claim 1, wherein the light source emits light of at least one wavelength which degenerates the chemotactic factor substance.

5. Process for producing a film as claimed in claim 1. wherein the atmosphere comprises air.

6. Process for producing a film as claimed in claim 2, wherein the atmosphere comprises air.

7. Process for producing a film as claimed in claim 3, wherein the atmosphere comprises air.

8. Process for producing a film as claimed in claim 2, wherein the light source is moved.

9. Process for producing a film as claimed in claim 2, wherein the film is moved.

10. Process for producing a film as claimed in claim 2, wherein both the light source and the film are moved.

* * * * *